Feb. 25, 1958  A. J. WHITEHILL  2,824,413
APPARATUS FOR MACHINING RADOME WALLS TO CONTROLLED
ELECTRICAL THICKNESS
Filed Sept. 25, 1956  3 Sheets-Sheet 3

INVENTOR.
ALBERT J. WHITEHILL
BY
Reynolds, Beach & Christensen
ATTORNEYS

United States Patent Office 2,824,413
Patented Feb. 25, 1958

2,824,413

APPARATUS FOR MACHINING RADOME WALLS TO CONTROLLED ELECTRICAL THICKNESS

Albert J. Whitehill, Seattle, Wash., assignor to Boeing Airplane Company, Seattle, Wash., a corporation of Delaware Application September 25, 1956, Serial No. 612,012

10 Claims. (Cl. 51—165)

This invention relates to improvements in apparatus for the precision machining of radomes and the like to controlled electrical wall thickness. In its preferred form as herein illustratively described such apparatus is adapted for correctively grinding to uniform electrical thickness the walls of elongated, generally ogival radomes of the type used in nose or tail radar installations in high-speed aircraft and missiles; however, it will be recognized that the invention has other applications and that certain modifications and changes may be made therein without departing from the essential features.

Efficient transmission of microwave energy through a solid dielectric wall is achieved only when the wall thickness electrically bears a predetermined ratio to the wavelength. For normal incidence the optimum thickness is substantially a half wave-length in the dielectric wall material. In very high frequency systems, such as K-band systems, wall thickness tolerances of the order of only a few thousandths of an inch or less are essential to efficient energy transmission. Due to the limitations of known techniques for molding large radomes for these operating frequencies it is practically impossible to achieve the required degree of accuracy and uniformity of thickness in the molding operation itself. In fact, even a perfectly precise molding technique for producing uniform physical thickness would not always or necessarily produce uniform electrical thickness because of variations in the dielectric constant of materials used. The practical difficulties of correcting these radomes which in some cases may be of the order of ten feet long or more and neither surface of which is sufficiently symmetrical or regular in form to present an absolute reference face from which to guide a machining tool will be manifest.

An object of the present invention is to provide automatic correction apparatus which, with a high degree of accuracy, is capable of machining a radome wall to a controlled or uniform electrical thickness throughout, overcoming the foregoing described and related problems in so doing. More specifically, it is an object to provide such apparatus which is capable of producing accurate results despite deviations in surface configuration from a norm or ideal form, whether such deviations be caused by pressure of the machining tool, distortion due to the weight and size of the radome and the manner of supporting the same or simply to imperfections in the molding of the basic radome undergoing corrections.

As illustrated, the invention provides a novel arrangement for supporting and moving a radome relative to a grinder or other machining tool and of moving the grinder against and from the radome surface in controlled manner so as to vary the bite thereof in accordance with deviations of electrical wall thickness from the desired value in the successive zones passing instantaneously beneath the grinder. For this purpose the grinder is mounted on a grinder base which is mounted to move in relation to the radome carriage in a direction transverse to the radome wall area instantaneously presented to such grinder, such grinder movement being effected under control of means responsive to electrical thickness measuring or record apparatus. Such latter means includes a feeler element urged into sliding contact with the radome wall at a location opposite the grinder tool and mounted to move in a direction transverse to the radome wall, relative to a sensing head supporting such feeler. The sensing head in turn is mounted on the grinder base to move relative to such base in the same direction as the feeler element. The sensing head is positionally controlled in accordance with electrical thickness requirements of the radome wall regions successively moved past the grinder whereas the grinder base and thereby the grinder are positionally controlled to vary the grinder's bite in accordance with relative positioning of the feeler and sensing head. The term "machining" is intended in its most general sense herein and embraces any abrasion or cutting operations for physically and thereby electrically reducing dielectric wall thickness as herein disclosed.

These and other features, objects and advantages of the invention will become more fully evident in the following description thereof by reference to the accompanying drawings.

Figure 1:
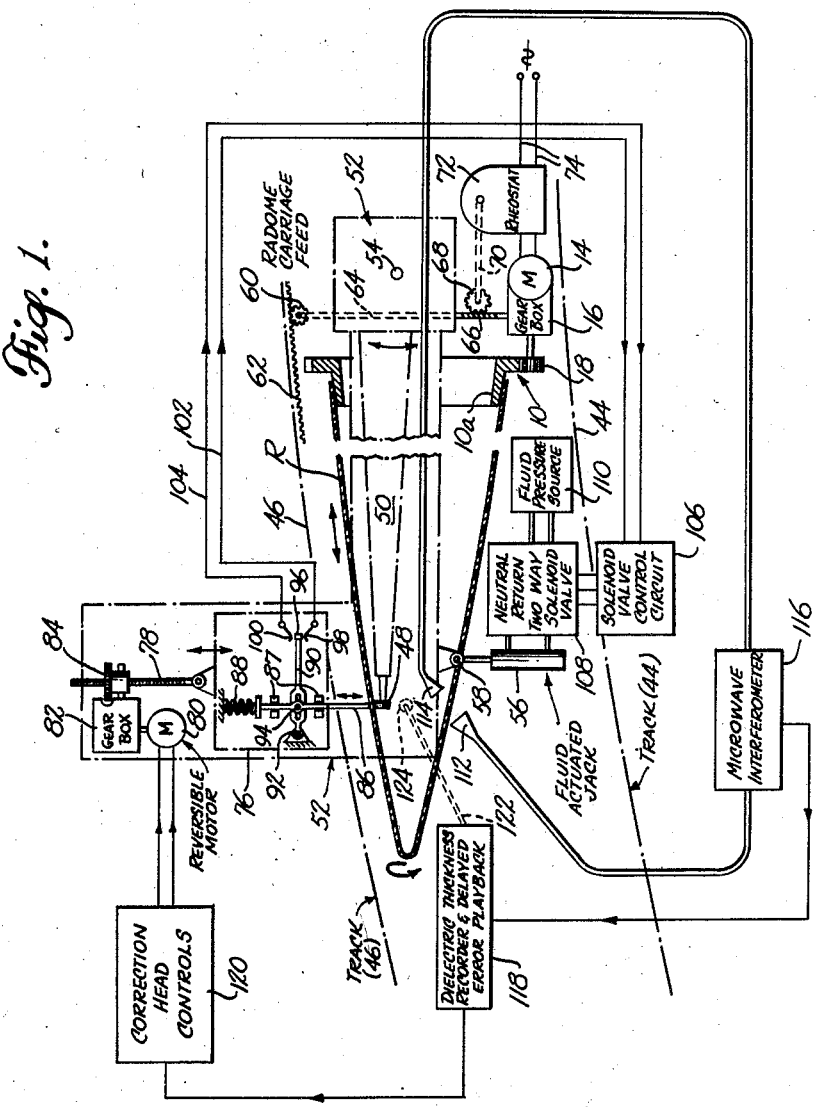
Figure 1 is a simplified diagram of the automatic controlled electrical thickness grinding apparatus comprising the invention.
Figure 2:
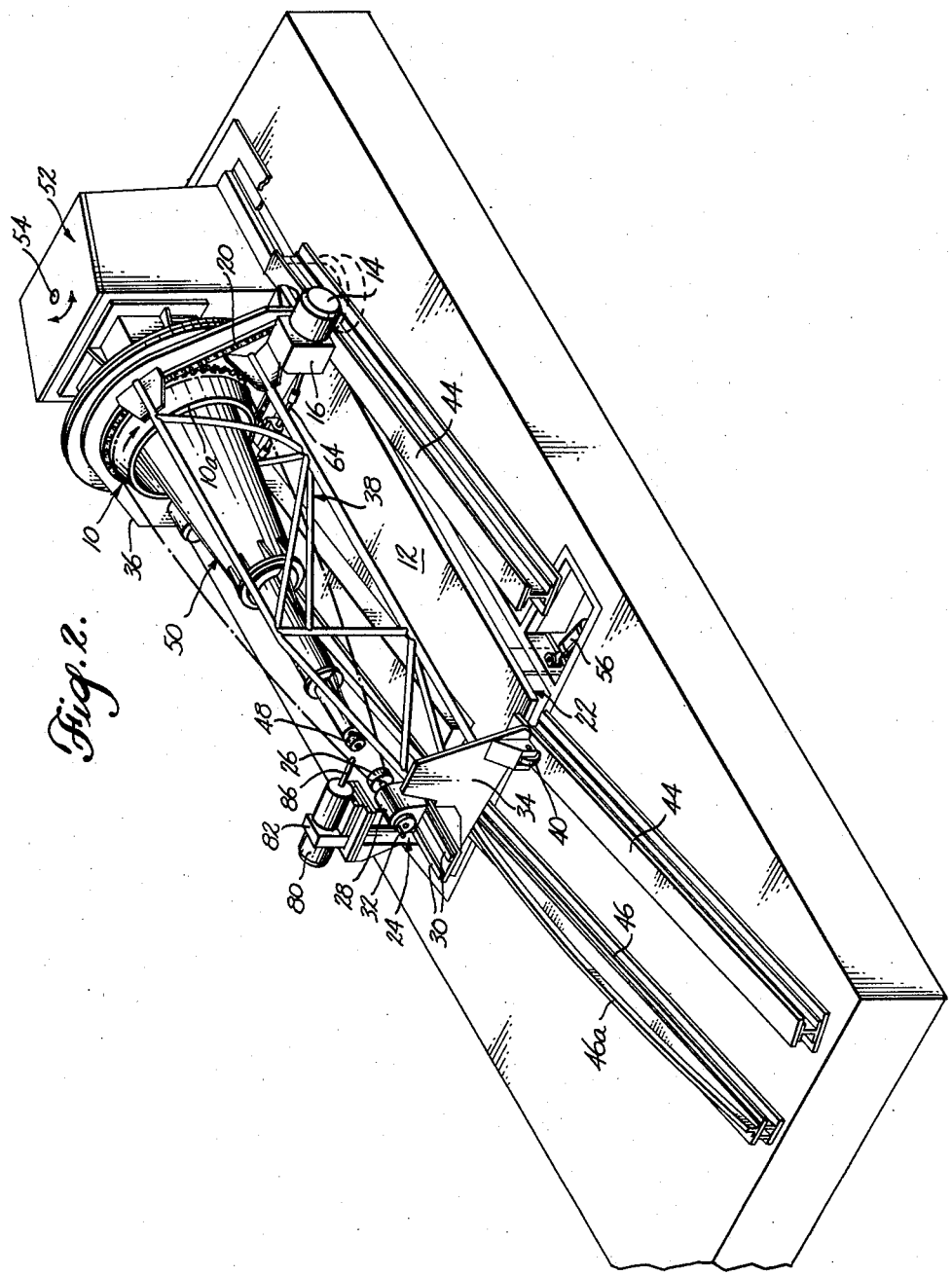
Figure 2 is a perspective view of the apparatus in its presently preferred mechanical form.

The radome R upon which the uniform electrical thickness grinding operation is to be performed in the illustration comprises an elongated ogival hollow form molded of solid dielectric material having an electrical wall thickness which is made initially at least equal to or in excess of the required finished electrical thickness for efficient microwave energy transmission therethrough at a selected operating frequency. Such a radome is suitable for mounting on the nose of an aircraft or missile, for example, as the housing for a microwave radar. It may be formed of laminated fibreglass cloth and a hard resin, or a ceramic or vitreous material or other suitable dielectric material. Its outer surface should be made as smooth as possible in the molding for incurring minimum air drag and for that reason as well as others it is preferred to perform the grinding operation solely on the inside face of the radome wall in order to achieve the desired uniformity of electrical thickness. It will be recognized, however, that the grinding may, in certain cases, be performed on the outside surface.

The radome in its unfinished, i. e., uncorrected, form is installed in the automatic grinding apparatus by pressing the open base thereof over the tapered flange 10a of the hollow ring gear 10 to create a tight friction fit therebetween with the longitudinal axis of the radome extending coaxially with the axis of rotation of the ring gear. The ring gear is part of a radome carriage 12 and is suitably journalled by means 36 to rotate on its axis in such carriage. For reasons of convenience the radome is supported to rotate about a horizontal axis. The ring gear 10 is driven by an electric motor 14 acting through a speed reduction unit or gear box 16, a sprocket 18, and a chain 20 meshing with the teeth of the ring gear.

The carriage base 22 which supports the ring gear and its drive means as just described has a centering chuck mechanism 24 including a cup-like receptacle 26 which receives and centers the tip of the radome coaxially with the ring gear. The chuck cup 26 is rotatively supported by the retractable head 28 which slides on the longitudinally extending tracks 30 and which may be clamped by suitable means (not shown) in any adjusted position along such tracks. Once clamped in position, additional pressure of the cup against the tip of the radome may be established by a feed crank 32. This firmly presses the radome base to a seat on the ring gear flange. The tracks which support the head 28 are in turn carried by an upright frame member 34 mounted on the base plate 22. The frame member 34 is rigidly braced in relation to the support-journal 36 for the ring gear by brace structure 38 extending lengthwise of the carriage alongside the radome supported therein.

Figure 3:
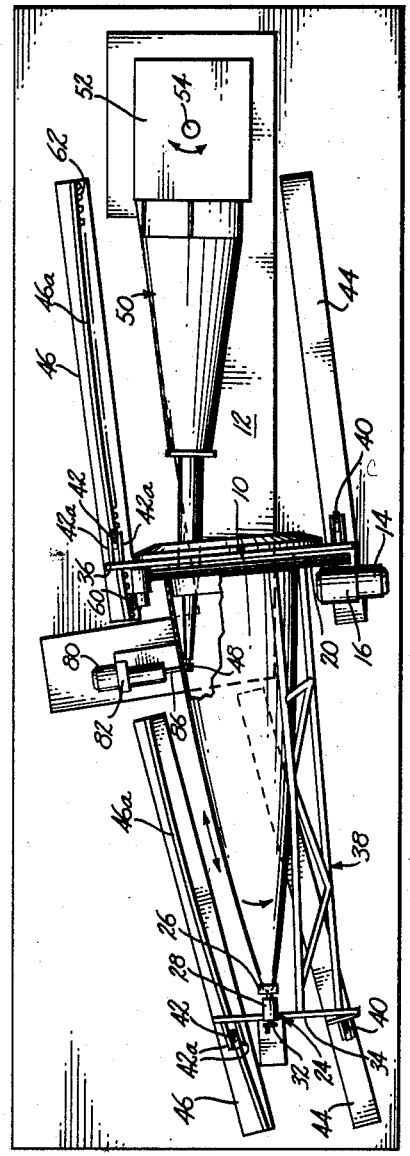
Figures 3 and 4 are plan views of such apparatus illustrating the radome in different positions relative to the grinding tool during a corrective grinding operation.
Figure 4:
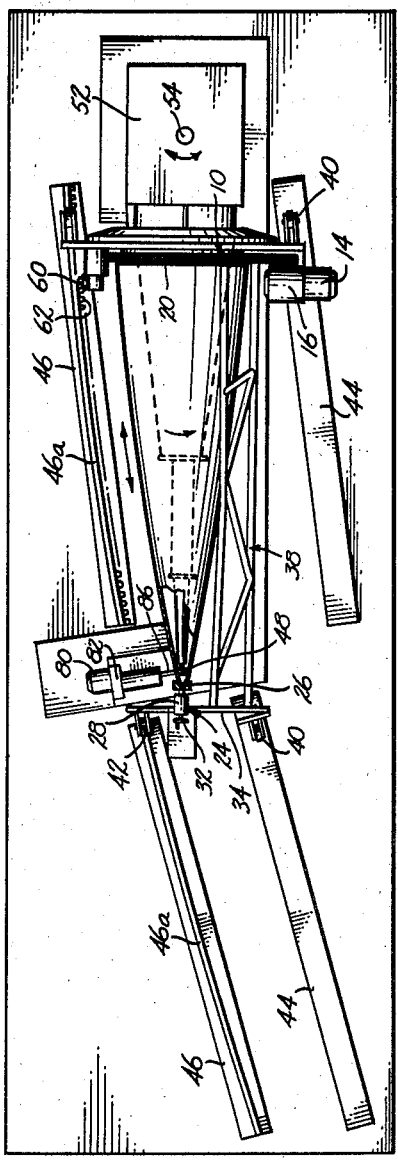

The carriage 12 supporting the radome for travel longitudinally is mounted on two sets of rollers 40 and 42 which run respectively on the two sets of tracks 44 and 46 (Figures 3 and 4). These tracks are curved approximately in conformity with the longitudinal curvature of the radome to be corrected by the grinding machine on the side of the radome at which the grinding tool is to be stationed. One set of tracks, such as the tracks 46 has upwardly projecting ribs 46a the opposite sides of which are engaged by retaining slides or rollers 42a to constrain the carriage to move along the described path of curvature.

A grinding tool 48 is mounted on a horizontally projecting cantilever support 50 fixed to and forming part of a grinder base 52. The cantilever support 50 projects through the interior of the ring gear 10 and into the hollow of the radome. Its length exceeds the combined length of the radome and its base support comprising the ring gear 10 and the journal means 36 supporting the same for rotation so that the grinding tool 48 may be projected any distance into the interior of the radome from its base substantially to its tip by advancement of the carriage from one extreme position to the other along the tracks. The grinder base 52 is in turn mounted to pivot on a vertical shaft 54 in order to move the grinder tool transversely in relation to the side of the radome presented thereto in order to vary the bite of the grinder in the wall material. The details of the cantilever support for the grinder and of the drive mechanism for turning the grinder at the required high speed are not illustrated in the drawings since they may vary and are of secondary importance to an understanding of the invention.

Such pivotal movement of the grinder base is effected by a fluid actuated jack 56 having a projecting piston rod which is pivotally connected at 58 to the grinder base. Control of fluid pressures in the jack to vary the bite of the grinder is effected in accordance with the electrical wall thickness correction requirements for the radome in a manner to be described hereinafter. The grinder tool working face is preferably inclined to its axis as shown to account for the slight angularity which, in the typical case, exists between the grinder axis and a longitudinal line on the surface of the radome interior at a point contacted by the grinder, so as to maximize the area of contact of the grinder with such surface.

In order for the grinder to cut the radome material efficiently in all areas requiring correction, it is desirable not only that the grinder rotate at constant speed by its drive means (not shown) but that the lineal or surface speed of the radome past the tool be approximately constant at all times. This presents a problem inasmuch as the diameter of the radome at its base is much larger than it is at the tip, and for every revolution of the radome the carriage should advance a definite and constant amount along the tracks in order to avoid variable overlap of the successive swaths made by the grinder in its spiral line of traversal in relation to the rotatively and longitudinally moving radome. The problem of advancing the radome carriage along the tracks by a definite increment for each revolution of the radome is solved by driving the carriage feed pinion 60 which engages a rack 62 extending along one of the tracks through the same gear box or transmission 16 as that which drives the ring gear 10. As shown in Figure 1 the pinion 60 is driven by a shaft 64 taken from the gear box 16. The problem of maintaining substantially constant lineal speed of the radome surface relative to the grinder is solved in the illustration by providing the shaft 64 with a worm 66 engaged by a wheel 68 which turns a shaft 70 controlling the position of the rotor of a rheostat 72. The windings of the rheostat 72 are connected in the energizing circuit 74 for the drive motor 14 to control the energization hence the speed of the motor. The rheostat windings are graduated in resistance value so that as the grinder moves relatively from the base to the tip of the radome the motor is speeded up inversely in proportion to the change of diameter of the radome.

Carried by the grinder base 52 is a sensing head 76 which is mounted for movement on such base in a direction generally transverse to the grinder axis and thereby to the radome wall presented to the grinder. Such movement of the sensing head is effected by suitable means such as a jack screw 78 driven in either direction by a reversible motor 80 acting through a gear box 82 and nut 84 driven thereby and engaging the jack screw to advance or retract the same. The sensing head 76 carries a feeler element 86 which bears against the outside face of the radome directly opposite the grinder tool 48. This feeler element, longitudinally slidable in the guides 87, is pressed continuously into contact with the radome surface by a spring 88. Longitudinal movement of the feeler 86, which slides in contact with the moving radome surface, is multiplied by a lever 90 pivoted at 92 on the sensing head 76 and coupled to the feeler element by a slot and pin connection 94. The projecting end of the lever 90 carries a switch contact element 96 which normally occupies a neutral position between the stationary switch contacts 98 and 100 rigidly carried by the sensing head 76. The respective contacts 98 and 100 are connected through conductors 102 and 104 to a solenoid valve control circuit 106 which determines energization of a neutral return solenoid valve 108 controlling actuation of the fluid actuated jack 56. The details of the solenoid valve control circuit and solenoid valve controlled thereby in order to deliver fluid under pressure from source 110 selectively to one end of the other of the fluid actuated jack may be conventional and require no description herein. The arrangement is such that engagement of stationary contact 100 by contact 96 operates the fluid actuated jack to advance the grinder tool against the radome surface, whereas engagement of the contact 98 by the contact 96 operates to retract the grinder tool from the radome surface. The spacing between these contacts is very slight, of the order of the required dimensional accuracy of radome wall thickness multiplied by the multiplication factor introduced by the multiplying lever 90. Thus, if there is a slight bulge in the shape of the radome surface at the region being traversed past the grinder 48, sensing element 86 would immediately be forced outwardly, and if the wall thickness remained unchanged, the resultant closure of contact 100 would cause enslavement of the grinder 48 to move outwardly by a corresponding amount so as to maintain a substantially constant spacing between the tip of the feeler 86 and the adjacent side of the grinder wheel 48, and the same bite of the grinder. A reverse action takes place in the event of a depression in the shape of the radome at any location. In other words, assuming for the moment that no change in the amount of correction of electrical thickness is being fed into the apparatus by means to be described, a substantially constant spacing is maintained between the grinder and the tip of the feeler 86 so as to maintain constant depth of cut of the grinder regardless of deviations in the shape of the radome from a norm or perfect symmetry.

In order to control the bite of the machining tool for electrical wall thickness correction it is necessary of course to measure the electrical wall thickness in all specific areas to be traversed past the grinder, and to cause more or less dielectric material to be removed in these specific areas from the radome in order to produce the required net thickness. For this purpose interferometer apparatus is employed including a transmitting horn 112 positioned on one side of the radome wall, and a receiving horn 114 positioned in alignment with the transmitting horn on the opposite side of the radome wall so as to pass a microwave energy test beam through the wall. The apparatus translates the resulting information of electrical wall thickness into appropriate control signals for varying the bite of the grinder tool. The microwave interferometer apparatus 116 may be generally similar to that disclosed in the co-pending application of Melvin J. Kofoid, Serial No. 604,673, assigned to the same assignee. The microwave interferometer output signals representing instantaneous deviations of wall thickness of the radome from the required value are recorded in suitable apparatus 118 and, as the radome is subsequently traversed past the grinder tool are played back with correct timing to suitable correction head controls 120 which operate the reversible motor 80. By this means the sensing head 76 is variably displaced relative to the grinder base in accordance with the amount of deviation of wall thickness from the required value as the succesive regions of the radome advance past the grinder tool during the combined playback and grinding operation. The recording and playback apparatus incorporated in the unit 118 is driven through any suitable means operated at a rate proportional to the lineal surface speed of the radome relative to the grinder. In the example such a drive means comprises shaft 122 rotated by a frictionally driven tracking wheel 124 placed against the radome to track in circumferential alignment with the grinding wheel 48.

In the drawing the horns 112 and 114 are shown on the side of the radome opposite from the grinding wheel 48. Preferably, in practice, the recording of electrical wall thickness is completed throughout the entire area of the radome before the grinding operation takes place, and during the recording operation the horns 112 and 114 occupy substantially the position of the grinding wheel 48 in relation to the radome configuration so that during longitudinal movement of the radome along the curved carriage tracks the physical relationship between the horns and the radome wall remain constant. After the electrical wall thickness record is made and the apparatus is set up for the grinding operation, the tracking roller 124, driving the playback apparatus, causes the reversible motor 80 to move the sensing head 76 in or out in relation to the radome in accordance with the wall thickness signals derived from the recording. If an area being traversed by the grinder 48 is of excessive thickness the sensing head 76 is advanced in relation to the radome which causes the contact 100 to be engaged by the contact 96, as if the feeler 86 had been forced outwardly away from the radome. This causes the fluid actuated jack 56 to advance the grinder wheel 48 more firmly against the radome surface and thereby increase the bite of the grinder. If the recorded thickness deviation signals indicate that less bite is required of the grinder, the sensing head 76 is retracted from the radome by operation of the motor 80 to close the contact 98 and thus reduce the pressure of the grinder against the radome surface.

There is therefore provided automatic means for operating a machining tool head in order to increase or decrease the bite of the tool without regard to deviations in the form of the radome configuration from a norm or symmetry. Shaping the tracks 44 and 46 in approximate conformity with the longitudinal curvature of the radome helps to minimize the required accommodational movement of the feeler and grinder inasmuch as, in the illustrated case at least, the radome is substantially symmetrical. However, the invention applies to non-symmetrical radomes or to radomes in which the tracks for the carriage element are not necessarily curved in conformity with the radome curvature inasmuch as the accommodational movement feature of the controls allows for dissymmetries within the limits of its design range.

These and other features and advantages of the invention will be recognized by those skilled in the art from a study of the foregoing description and accompanying illustrations.

I claim as my invention:

1. Apparatus for machining to a predetermined electrical thickness the wall of a radome and the like comprising an elongated hollow generally annular figure, said apparatus comprising means for supporting such a radome and rotating the same about the longitudinal axis thereof, a machining tool element, a cantilever support for said machining tool element positioned relative to said radome supporting means to project into the radome interior generally lengthwise thereof for applying said machining tool element operatively to the interior surface of the radome, carriage means for effecting progressive relative movement between said radome supporting means and said cantilever support in the direction generally lengthwise of the rotating radome to effect both circumferential and longitudinal traversal of the radome in relation to said machining tool element, said cantilever support being mounted to permit movement thereof and of said machining tool element generally transversely in relation to the radome, an actuator connected to said cantilever support to effect such transverse movement thereof and thereby advance or retract the machining tool element in relation to the radome surface being machined, radome wall thickness sensing means mounted outside the supported radome and having a feeler element in contact with the radome wall directly opposite said machining tool element, said sensing means further including a base rigidly connected to said element cantilever support to move therewith, a traversing head mounted on said base for movement relative thereto in the direction generally perpendicular to the radome surface contacted by said feeler element, said traversing head in turn carrying said feeler element to permit movement of the latter relative to said traversing head in the same direction, means on said traversing head yieldably urging said feeler element into sliding contact with the radome surface, and positional pickup means including mutually cooperating elements carried respectively by said feeler element and said traversing head, said positional pickup means being arranged for controlling operation of said actuator to move said machining tool element in the sense toward the radome wall in response to predetermined displacement of said feeler element on said traversing head in the sense away from the radome surface, and in the sense away from said radome wall in response to predetermined opposite displacement of said feeler element relative to said traversing head, and means for measuring electrical thickness of said radome in the different areas thereof presented to said machining tool element and operatively connected to said traversing head for moving the same on said base toward and from the radome by amounts corresponding to the magnitude and sense of the measured difference between a predetermined value of electrical thickness desired for the radome wall and the instantaneous electrical thickness of the radome wall at the point thereof presented to the machining tool element.

2. The apparatus defined in claim 1, wherein the machining tool element support is mounted to pivot in relation to the radome about an axis generally perpendicular to the longitudinal axis of the supported radome.

3. The apparatus defined in claim 1, wherein the machining tool element support is mounted to pivot in relation to the radome about an axis generally perpendicular to the longitudinal axis of the supported radome, and the carriage means includes track means extending generally longitudinally of the radome and curved substantially in conformity with the longitudinal curvature of the radome on the side thereof presented to the machining tool element, and means guiding said radome supporting means for movement along said track means.

4. The apparatus defined in claim 3, wherein the radome is of generally tapered form and the carriage means effects relative movement between the radome and machining tool element from one end of the radome progressively toward the opposite end thereof, a single drive means connected to said carriage means for producing such movement and to said radome support for producing rotation thereof at an angular speed bearing a fixed relation to the rate of longitudinal advance of the radome, and speed control means progressively adjusted by continuing operation of said drive means and connected to said drive means for progressively changing the speed of operation as a result of such adjustment at a rate which maintains substantially constant peripheral velocity of the radome past the machining tool element.

5. Apparatus for grinding to a predetermined electrical thickness the wall of a radome and the like comprising an elongated hollow generally annular figure, said apparatus comprising means for supporting such a radome and rotating the same about the longitudinal axis thereof, a machining tool element, a support for said machining tool element positioned relative to said radome supporting means for applying said machining tool element operatively to one surface of the radome, carriage means for effecting progressive relative movement between said radome supporting means and said machining tool element support in the direction generally lengthwise of the rotating radome to effect both circumferential and longitudinal traversal of the radome in relation to said machining tool element, said machining tool element support being mounted to permit movement thereof and of said machining tool element generally transversely in relation to the radome, an actuator connected to said machining tool element support to effect such transverse movement thereof and thereby advance or retract the element in relation to the radome surface being machined, radome wall thickness sensing means having a feeler element in contact with the radome wall directly opposite said machining tool element, said sensing means further including a base rigidly connected to said machining tool element support to move therewith, a traversing head mounted on said base for movement relative thereto in the direction generally perpendicular to the radome surface contacted by said feeler element, said traversing head in turn carrying said feeler element to permit movement of the latter relative to said traversing head in the same direction, means on said traversing head yieldably urging said feeler element into sliding contact with the radome surface, and positional pickup means including mutually cooperating elements carried respectively by said feeler element and said traversing head, said positional pickup means being arranged for controlling operation of said actuator to move said machining tool element in the sense toward the radome wall in response to predetermined displacement of said feeler element on said traversing head in the sense away from the radome surface, and in the sense away from said radome wall in response to predetermined opposite displacement of said feeler element relative to said traversing head, and means for measuring electrical thickness of said radome in the different areas thereof presented to said machining tool element and operatively connected to said traversing head for moving the same on said base toward and from the radome by amounts corresponding to the magnitude and sense of the measured difference between a predetermined value of electrical thickness desired for the radome wall and the instantaneous electrical thickness of the radome wall at the point thereof presented to the machining tool element.

6. The apparatus defined in claim 5, wherein the radome is of generally tapered form and the carriage means effects relative movement between the radome and machining tool element from one end of the radome progressively toward the opposite end thereof, a single drive means connected to said carriage means for producing such movement and to said radome support for producing rotation thereof at an angular speed bearing a fixed relation to the rate of longitudinal advance of the radome, and speed control means progressively adjusted by continuing operation of said drive means and connected to said drive means for progressively changing the speed of operation as a result of such adjustment at a rate which maintains substantially constant peripheral velocity of the radome past the machining tool element.

7. The apparatus defined in claim 5, wherein the radome supporting and rotating means comprises an open ring-like member adapted to engage and hold the radome by the base thereof to rotate about its longitudinal axis, and wherein the machining tool element support comprises an elongated spindle arm projecting through said ring-like member into the radome interior generally longitudinally thereof, said arm being of a length at least substantially equal to the radome length to permit machining of said radome substantially from one end to the other thereof by progressive rotational and longitudinal movement of the radome relative to the machining tool element.

8. The apparatus defined in claim 7, wherein the machining tool element support is mounted to pivot in relation to the radome about an axis generally perpendicular to the longitudinal axis of the supported radome, and the carriage means includes track means extending generally longitudinally of the radome and curved substantially in conformity with the longitudinal curvature of the radome on the side thereof presented to the machining tool element, and means guiding said radome supporting means for movement along said track means.

9. Means for grinding a dielectric wall to a controlled electrical thickness, comprising a machining tool element, base means supporting said machining tool element to permit movement thereof bodily in a predetermined path, carriage means for supporting the dielectric wall adjacent said machining tool element to extend generally transversely to the machining tool element path and to move progressively in its direction of extent relative to said machining tool element, thereby to permit machining of the face of said wall adjacent said machining tool element progressively along the extent thereof, a sensing head mounted on said base means and movable relative thereto in a direction generally transverse to the extent of said wall, a feeler carried by said sensing head and movable relative thereto in a direction generally transverse to the extent of said wall, said feeler being positioned to slidably contact said wall at a location thereon substantially directly opposite said machining tool element, means urging said feeler into such contact with the wall, means coordinated with progressive movement of said wall movably positioning said sensing head on said machining tool base means in accordance with deviations between initial thickness of the wall at the instantaneous location thereon of the machining tool element and the controlled thickness required for said wall at each such location to be produced by said machining tool element, machining tool bite control means operable to actuate said base means for movement of said machining tool element toward and from said wall, and means controlled by movement of said feeler relative to said sensing head and in turn arranged to control operation of said bite control means for moving said machining tool element toward and from said wall to vary the bite thereof in accordance with deviations of wall thickness below or above the required controlled thickness thereof.

10. Means for machining a dielectric wall to a predetermined uniform electrical thickness, comprising a machining tool element, base means supporting said machining tool element to permit movement thereof bodily in a predetermined path, carriage means for supporting the dielectric wall adjacent said machining tool element to extend generally transversely to the machining tool element path and to move progressively in its direction of extent relative to said machining tool element, thereby to permit grinding of the face of said wall adjacent said machining tool element progressively along the extent thereof, a sensing head mounted on said base means and movable relative thereto in a direction generally transverse to the extent of said wall, a feeler carried by said sensing head and movable relative thereto in a direction generally transverse to the extent of said wall, said feeler being positioned to slidably contact said wall at a location thereon substantially directly opposite said machining tool element, means urging said feeler into such contact with the wall, means coordinated with progressive movement of said wall movably positioning said sensing head on said base means in accordance with deviations between initial thickness of the wall at the instantaneous location thereon of the machining tool element and said predetermined thickness, machining tool bite control means operable to actuate said base means for movement of said machining tool element toward and from said wall, and means controlled by movement of said feeler relative to said sensing head and in turn arranged to control operation of said bite control means for moving said machining tool element toward and from said wall to vary the bite thereof in accordance with deviations of wall thickness below or above said predetermined thickness thereof.

References Cited in the file of this patent

UNITED STATES PATENTS

| | | |
|---|---|---|
| 2,452,926 | Gruetjen | Nov. 2, 1948 |
| 2,765,592 | Krug | Oct. 9, 1956 |